(Model.)
J. SELBY.
CORN PLANTER.
No. 523,414. Patented July 24, 1894.
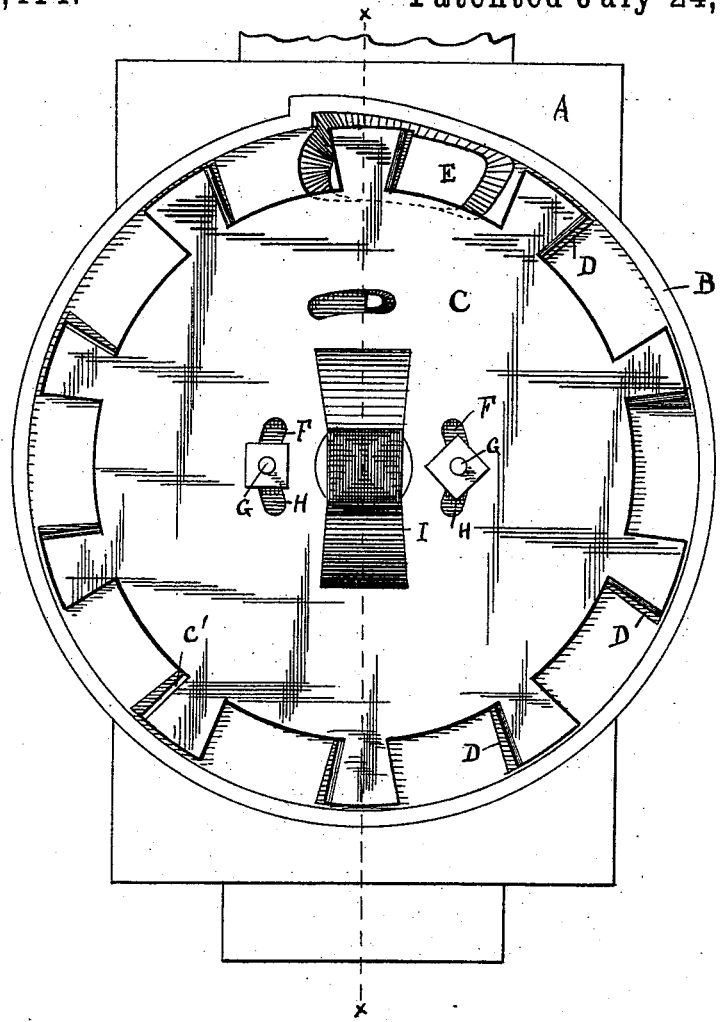
Fig. 1.
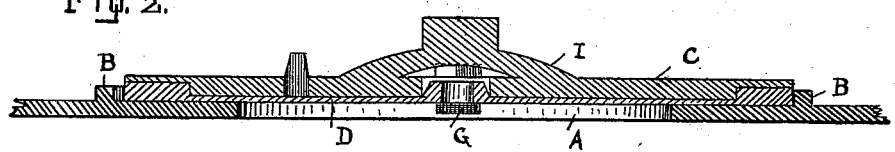
Fig. 2.
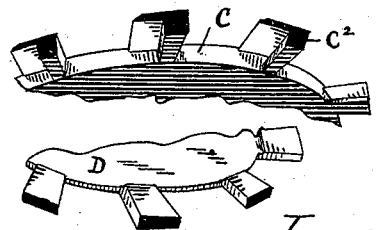
Witnesses — Minnie Haley
Inventor — James Selby
By W. V. Leff, atty.

UNITED STATES PATENT OFFICE.

JAMES SELBY, OF PEORIA, ILLINOIS.

CORN-PLANTER.

SPECIFICATION forming part of Letters Patent No. 523,414, dated July 24, 1894.

Application filed February 2, 1894. Serial No. 498,829. (Model.)

*To all whom it may concern:*

Be it known that I, JAMES SELBY, a citizen of the United States, residing at Peoria, in the county of Peoria and State of Illinois, have invented certain new and useful Improvements in Corn-Planters; and I do hereby declare that the following is a full, clear, and exact description of the invention, which will enable others skilled in the art to which it appertains to make and use the same.

My invention relates to certain new and useful improvements in corn planters, the addition of my improvements thereto rendering the same more efficient in its working, and provides a simple, durable, and valuable attachment thereto.

More particularly my invention relates to a seed disk, and belongs to that class that are designed to be turned within the seed box to facilitate in the proper dropping of the grain. The particular and peculiar construction of my seed disk renders the same capable of regulating the quantity of seed designed to be dropped in each hill, and by adjustment may be graduated to drop one or more grains as may be desired, and its formation in connection with an auxiliary band, which although not integrally connected therewith must be considered as a part thereof, insures the sure and certain dropping of the grain.

My invention consists essentially of two plates bearing one upon the other, and each respectively having the peripheral edge thereof provided with a series of notches cut in any form desired, of means for securing or holding the plates together, and of a circumferentially disposed rim matching with the circumferences of the respective seed disks excepting at a short interval in said circumferentially disposed rim, at which point it is slightly expanded, there being also provided at this point of such expansion an opening in the plate with which the said rim is integrally connected, and upon which the seed disk is designed to bear, and of certain other details of formation as will hereinafter be more particularly described.

That my invention may be more fully understood reference is had to the accompanying drawings, in which—

Figure 1 is a plan view of the seed disk in adjustment upon a bearing plate and showing its relation to the circumferentially disposed rim. Fig. 2 is a cut section through line $x$, $x$, of Fig. 1, and shows the adjustment and bearing relation of the several parts of the device. Fig. 3 shows the detailed structure and matching relation of the two plates that form the seed disk, a portion of the same being broken away. Figs. 4 and 5 are sections of the two plates, which form the seed disk showing the same separated.

In the above figures, I have only shown the seed disk, and such auxiliary parts as are necessary to illustrate the adjustment and workings of my invention.

In the figures A represents a bottom part to a seed box upon which there is integrally connected and mounted a circular plate; B is a band or rim bounding the said plate the same being slightly expanded at the point therein where it bounds the opening E cut in the circumferential edge of the circular plate, this perforation E in said plate when the device is applied to a planter being designed to open out into the shank thereof.

D is a circular disk designed to bear upon the circular plate, its bearing relation being best shown in Fig. 2, the said plate being circumferentially notched, the particular manner of such notching being best shown in Fig. 5; C is also a circular disk designed to bear upon disk D, the particular manner of such notching being best shown in Fig. 2, the said plate C being peripherally notched and having the intervening extensions $C^2$ cut out as best shown in Fig. 4, the said plate being provided with the integral part I, which consists merely in the central portion thereof being slightly raised and surmounted by a rectangularly formed lug.

The plate C is placed above the plate D so that their peripheral notches coincide. The two plates may be adjusted relatively to each other for the purpose of enlarging or reducing the size of the notches, they being held in place after adjustment by means of bolts G, G, passing through apertures in the plates. The perforations or apertures in plate D are circular, while those in plate C are elongated as at F, H, F, H, and are arc-like in shape.

Assuming that the plate A is properly adjusted in connection with the seed disk, and also with the planter shank, the same having a horizontal bearing with relation thereto, the seed disk which is formed of the two disks C and D is placed upon the circular plate of the bottom part A the formation of the disk being designed to be such that the peripheral edges thereof, which is the outer circumference of the respective disks, will bear against the circumferentially disposed rim B excepting at the point hereinbefore designated, that is around the slot E where the said rim is slightly expanded, the said rim thus forming by such conjunction of the peripheral notched seed plate and rim B a series of slots, the said rim B forming one side thereof within which the deposits of grain are designed to be made. The size of the slots in the peripheral edge of the disk will govern the amount of seed deposit therein, if but one grain is desired the slots would necessarily be small, and if two or more grains were desired, the slots should be correspondingly larger. The sizes of these slots are easily regulated by the adjustment of one plate upon the other, that is by the moving of the upper plate C in one direction or the other according as it is desired that the slots shall be larger or smaller. To accommodate this adjustment and the securing of the same when the proper adjustment is obtained, the perforations, slots, and bolts as F, F, H, H, and G, G, are provided, and when the impinging bolts or taps thereon are loosened, the upper plate C is turned in the direction desired to provide for the forming of the proper size of slot, and is there fixed. This will be seen by reference to Fig. 3, where it is shown that the upper disk has been turned slightly from its normal adjustment, which would be when the extensions $C^2$ were in close contact with the extensions from lower disk D, which would accommodate the formation of the largest sized slot with the intention of diminishing the size of the slot, and it will be seen from this figure also that the upper disk C may also be turned farther in the same direction for making the slots still smaller, and when the disks are fixed by means of the impinging bolts as previously mentioned and turned in the operation of the planter in conjunction with rim B, so as to accommodate just the deposit of seed therein desired, the said slots will be carried around so that successively they will bear over the opening E at which point the rim B expands, thus increasing the size of the slot by the bearing outwardly of one side thereof so that the deposit of grain therein will be freed from any impingement there might have been in its being carried in the smaller slot thus insuring the sure dropping thereof through the opening E.

In the operation of the seed disk, it will be seen that it will be necessary to use in connection therewith the usual false bottom within the seed disk, which properly protects certain parts thereof, and provides for the cutting out just above the opening E of all grain except that within the slot being carried over said opening.

The improvements which have been herein set forth are especially designed to overcome the difficulties which I find are incident to a construction similar to that shown in my Patent No. 455,840, dated July 14, 1891, in which the adjustable seed disks have apertures between the periphery and the center of the disks. I am aware that it is not new to provide a seed disk with peripheral notches, but by forming the notches at the edges of the disks and then providing them with adjusting means, I attain a result which has not before been reached, in the use of either a single peripherally notched disk, or in adjustable superposed disks in which the seed apertures are located within the peripheries thereof.

Having thus fully described my invention, what I claim, and desire to secure by Letters Patent, is—

The combination with the flanged rim having a cut out portion above the point of delivery of the grain, of two seed disks, one placed above the other and both having substantially U - shaped peripheral notches, adapted to register with the aforesaid cut-out portion of the rim, said plates being adjustable relatively to each other for varying the width of the notches at the periphery of the disks, and means for securing said plates together after adjustment, substantially as set forth.

In testimony whereof I affix my signature in presence of two witnesses.

JAMES SELBY.

Witnesses:
HENRY S. HARTZ,
W. V. TEFFT.